(12) United States Patent
Delaney et al.

(10) Patent No.: US 9,453,597 B2
(45) Date of Patent: Sep. 27, 2016

(54) AIR INVERSION AND STEAM CURE OF CURED IN PLACE LINERS APPARATUS

(71) Applicant: INA Acquisition Corp., Wilmington, DE (US)

(72) Inventors: Charles Delaney, Troy, MO (US); Kurt Schlake, Eureka, MO (US); Joseph M Coyne, St. Charles, MO (US); Richard C. Polivka, Lemont, IL (US); Franklin T Driver, St. Charles, MO (US)

(73) Assignee: INA Acquisition Corp., Wilmington, DE (US)

( * ) Notice: Subject to any disclaimer, the term of this patent is extended or adjusted under 35 U.S.C. 154(b) by 731 days.

(21) Appl. No.: 13/693,972

(22) Filed: Dec. 4, 2012

(65) Prior Publication Data

US 2013/0263443 A1 Oct. 10, 2013

Related U.S. Application Data

(63) Continuation of application No. 11/411,213, filed on Apr. 24, 2006, now abandoned.

(51) Int. Cl.
*B29C 63/36* (2006.01)
*F16L 9/14* (2006.01)
(Continued)

(52) U.S. Cl.
CPC .................. *F16L 9/14* (2013.01); *B29C 63/36* (2013.01); *F16L 55/1651* (2013.01); *F16L 55/18* (2013.01); *Y10T 29/53126* (2015.01)

(58) Field of Classification Search
CPC ........ B29C 63/36; F16L 9/14; F16L 55/1651
See application file for complete search history.

(56) References Cited

U.S. PATENT DOCUMENTS 3,579,836 A 5/1971 Kraus
4,009,063 A 2/1977 Wood
(Continued)

FOREIGN PATENT DOCUMENTS

DE 102004043383 A1 3/2006
EP 0275060 A1 7/1988
(Continued)

OTHER PUBLICATIONS

PCT International Search Report for PCT/US2006/015404 mailed Feb. 16, 2007, 5 pages.
(Continued)

*Primary Examiner* — Steven D Maki
(74) *Attorney, Agent, or Firm* — Senniger Powers LLP

(57) ABSTRACT

An air inversion and steam cure apparatus for installing a flexible resin impregnated cured in place liner in an existing conduit is provided. The apparatus has a low friction seal between a moving liner and the stationary apparatus gland. The gland is operated and adjusted by displaceable members that move substantially perpendicular to the liner being inverted to engage the moving liner as it passes through the gland. No part of the gland extends into the chamber so that once a pre-shaped gland is adjusted, the pressure on the moving liner is not increased. As the liner reaches the distal end, it enters a sample and porting pipe with an exhaust pipe gland and exhaust pipe and is pierced by a rigid porting tool. Steam is then introduced into the liner to cure the resin and is exhausted through an exhaust hose connected to the porting tool. After cure, steam is replaced with air to cool the liner and the ends are cut to restore service through the existing conduit.

32 Claims, 7 Drawing Sheets

(51) Int. Cl.
  *F16L 55/165* (2006.01)
  *F16L 55/18* (2006.01)

(56) References Cited

U.S. PATENT DOCUMENTS

| | | |
|---|---|---|
| 4,064,211 A | 12/1977 | Wood |
| 4,135,958 A | 1/1979 | Wood |
| 4,366,012 A | 12/1982 | Wood |
| 4,368,091 A | 1/1983 | Ontsuga et al. |
| 4,385,885 A | 5/1983 | Wood |
| 4,427,480 A | 1/1984 | Kamuro et al. |
| 5,015,326 A | 5/1991 | Frank |
| 5,154,936 A | 10/1992 | Driver et al. |
| 5,167,901 A | 12/1992 | Driver et al. |
| 5,358,359 A | 10/1994 | Long, Jr. |
| 5,597,353 A | 1/1997 | Alexander, Jr. |
| 6,244,846 B1 | 6/2001 | Keller |
| 6,270,289 B1 | 8/2001 | Einhaus et al. |
| 6,390,795 B1 | 5/2002 | Waring et al. |
| 6,539,979 B1 | 4/2003 | Driver |
| 6,579,409 B2 | 6/2003 | Cullins et al. |
| 6,679,293 B2 | 1/2004 | Driver |
| 6,708,728 B2 | 3/2004 | Driver et al. |
| 6,942,426 B1 | 9/2005 | Kampbell et al. |
| 6,960,313 B2 | 11/2005 | Waring et al. |
| 7,476,348 B2 | 1/2009 | Waring |
| 2007/0029688 A1 | 2/2007 | Delaney et al. |

FOREIGN PATENT DOCUMENTS

| | | |
|---|---|---|
| JP | 01-242231 A | 9/1989 |
| JP | 2955355 B2 | 7/1999 |
| JP | 2000351158 A | 12/2000 |
| KR | 20040100004 | 12/2004 |
| KR | 1020050020014 | 3/2005 |
| WO | 92/14961 A1 | 9/1992 |
| WO | 98/46929 A1 | 10/1998 |
| WO | 02/35136 A1 | 5/2002 |

OTHER PUBLICATIONS

Written Opinion for PCT/US2006/015404 mailed Feb. 16, 2007, 7 pages.
Restriction Requirement issued Jun. 23, 2009 in related U.S. Appl. No. 11/411,213, 14 pages.
Response to Restriction Requirement filed on Dec. 23, 2009 in related U.S. Appl. No. 11/411,213, 21 pages.
Final Rejection issued Feb. 4, 2010 in related U.S. Appl. No. 11/411,213, 28 pages.
Response to Final Rejection filed Jun. 3, 2010 in related U.S. Appl. No. 11/411,213, 24 pages.
Office Action issued Jun. 25, 2010 in related U.S. Appl. No. 11/411,213, 16 pages.
Response to Office Action filed Oct. 25, 2010 in related U.S. Appl. No. 11/411,213, 20 pages.
Final Rejection issued Jan. 7, 2011 in related U.S. Appl. No. 11/411,213, 12 pages.
Response to Final Rejection filed May 9, 2011 in related U.S. Appl. No. 11/411,213, 10 pages.
Office Action issued Jul. 22, 2011 in related U.S. Appl. No. 11/411,213, 16 pages.
Response to Office Action filed Oct. 24, 2011 in related U.S. Appl. No. 11/411,213, 16 pages.
Office Action issued Jan. 6, 2012 in related U.S. Appl. No. 11/411,213, 20 pages.
Response to Office Action filed May 7, 2012 in related U.S. Appl. No. 11/411,213, 17 pages.
Final Office Action issued Jun. 4, 2012 in related U.S. Appl. No. 11/411,213, 16 pages.

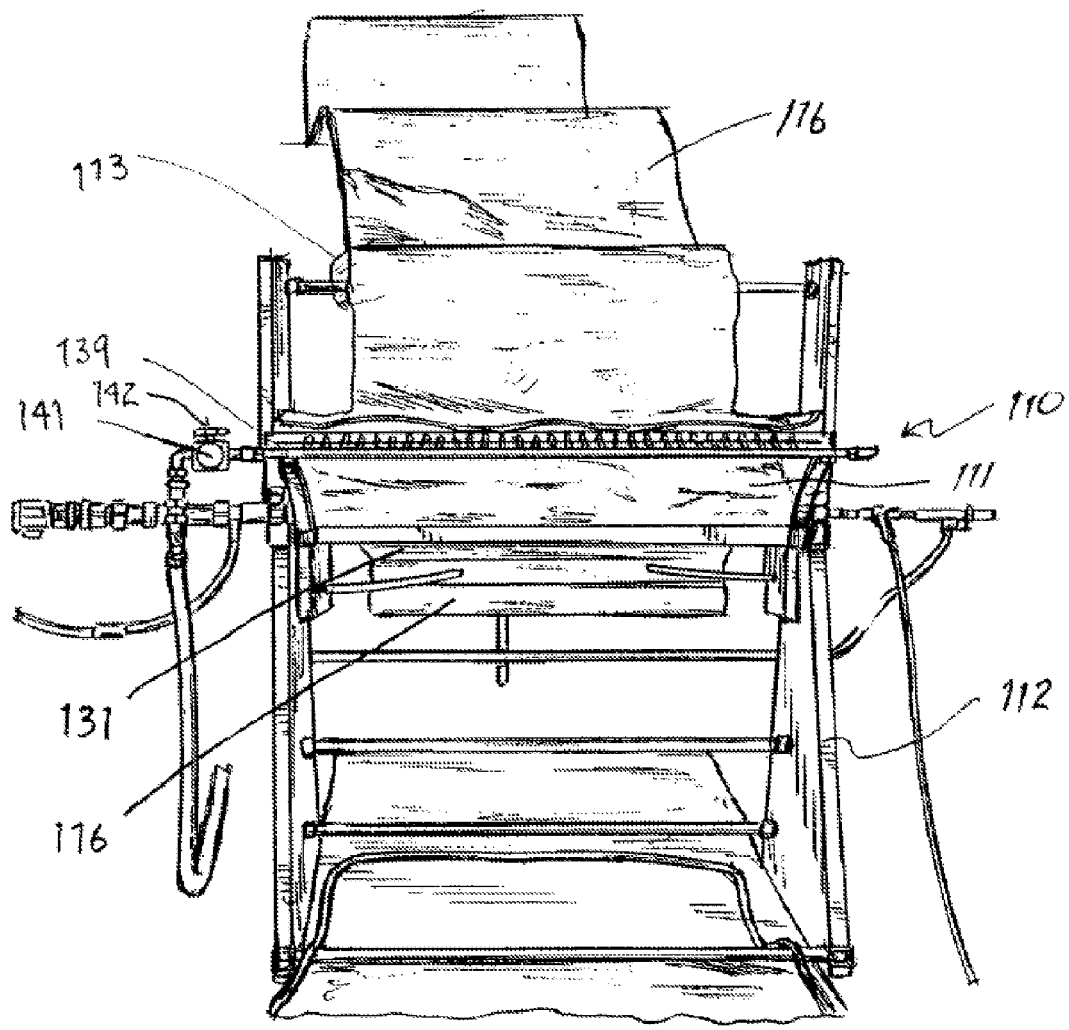

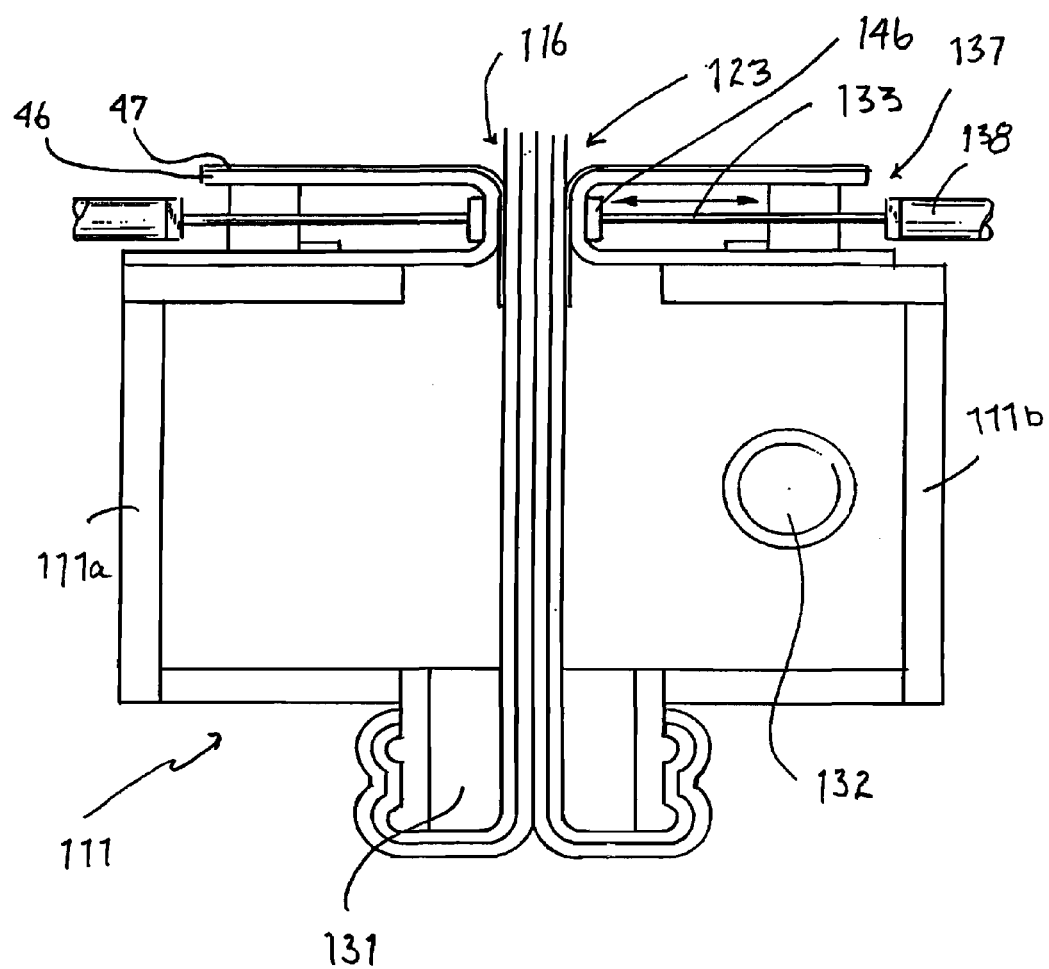

AIR INVERSION AND STEAM CURE OF CURED IN PLACE LINERS APPARATUS

CROSS-REFERENCE TO RELATED APPLICATIONS

This application is based on and claims the benefit of pending non-provisional application Ser. No. 11/411,213, filed Apr. 24, 2006, claiming benefit of provisional application Ser. Nos. 60/674,420 and 60/700,632, filed on Apr. 25, 2005 and Jul. 19, 2005, the entire contents of each of which is hereby incorporated herein by reference.

BACKGROUND OF THE INVENTION

This invention relates to a method for installation of a cured in place liner into an existing conduit by air inversion of a resin impregnated liner with an apparatus having a low friction seal between the everting liner and a gland. The resin may be cured with continuous flow-through steam without loss of pressure and to the apparatuses for practicing the method. The method and apparatuses are particularly well suited for lining small to medium diameter conduits.

It is generally well known that conduits or pipelines, particularly underground pipes, such as sanitary sewer pipes, storm sewer pipes, water lines and gas lines that are employed for conducting fluids frequently require repair due to fluid leakage or deterioration. The leakage may be inward from the environment into the interior or conducting portion of the pipelines. Alternatively, the leakage may be outward from the conducting portion of the pipeline into the surrounding environment. In either case, it is desirable to avoid this leakage.

The leakage may be due to improper installation of the original pipe, or deterioration of the pipe itself due to normal aging or to the effects of conveying corrosive or abrasive material. Cracks at or near pipe joints may be due to environmental conditions such as earthquakes or the movement of large vehicles on the overhead surface or similar natural or manmade vibrations, or other such causes. Regardless of the cause, such leakage is undesirable and may result in waste of the fluid being conveyed within the pipeline, or result in damage to the surrounding environment and possible creation of a dangerous public health hazard. If the leakage continues it can lead to structural failure of the existing conduit due to loss of soil and side support of the conduit.

Because of ever increasing labor, energy and machinery costs, it is increasingly more difficult and less economical to repair underground pipes or portions that may be leaking by digging up and replacing the pipes. As a result, various methods had been devised for the in place repair or rehabilitation of existing pipelines. These new methods avoid the expense and hazard associated with digging up and replacing the pipes or pipe sections, as well as the significant inconvenience to the public. One of the most successful pipeline repair or trenchless rehabilitation processes that is currently in wide use is called the Insituform® Process. This Process is described in U.S. Pat. Nos. 4,009,063, 4,064,211 and 4,135,958, all the contents of which are incorporated herein by reference.

In the standard practice of the Insituform Process an elongated flexible tubular liner of a felt fabric, foam or similar resin impregnable material with an outer impermeable coating that has been impregnated with a thermosetting curable resin is installed within the existing pipeline. Generally, the liner is installed utilizing an eversion process, as described in the later two identified Insituform patents. In the eversion process, radial pressure applied to the interior of an everted liner presses it against and into engagement with the inner surface of the pipeline. However, the Insituform Process is also practiced by pulling a resin impregnated liner into the conduit by a rope or cable and using a separate fluid impermeable inflation bladder or tube that is everted within the liner to cause the liner to cure against the inner wall of the existing pipeline. Such resin impregnated liners are generally referred to as "cured-in-place-pipes" or "CIPP liners" and the installation is referred to a CIPP installation.

The CIPP flexible tubular liners have an outer smooth layer of relatively flexible, substantially impermeable polymer coating the outside of the liner in its initial state. When everted, this impermeable layer ends up on the inside of the liner after the liner is everted during installation. As the flexible liner is installed in place within the pipeline, the pipeline is pressurized from within, preferably utilizing an eversion fluid, such as water or air to force the liner radially outwardly to engage and conform to the interior surface of the existing pipeline.

Typically, an eversion tower is erected at the installation site to provide the needed pressure head to evert the liner or a bladder. Alternately, an eversion unit as shown and described in U.S. Pat. No. 5,154,936, U.S. Pat. No. 5,167,901 (RE 35,944) and U.S. Pat. No. 5,597,353, the contents of which are incorporated herein by reference. Cure may be initiated by introduction of hot water into the everted liner through a recirculation hose attached to the end of the everting liner. Inversion water is recirculated through a heat source such as a boiler or heat exchanger and returned to the inverted tube until cure of the tube is complete. The resin impregnated into the impregnable material is then cured to form a hard, tight fitting rigid pipe lining within the existing pipeline. The new liner effectively seals any cracks and repairs any pipe section or pipe joint deterioration in order to prevent further leakage either into or out of the existing pipeline. The cured resin also serves to strengthen the existing pipeline wall so as to provide added structural support for the surrounding environment.

The eversion tower, which was time consuming to construct, caused workers to be 30 feet above the ground often near trees and electrical wires. This method was improved by an apparatus, which allowed Insituform to create a hydraulic head by the use of a sphincter valve. The tube was fed into the top of the apparatus and pulled through the sphincter valve by pressurized water below the valve. The pressurized water applied a force on the nose of the tube causing it to invert into the pipe being rehabilitated. These apparatuses for the rehabilitation of small diameter pipe have been in use for about fourteen years.

The major disadvantage to the use of these apparatuses with water is the quantity and availability of the inverting water. Water must be heated typically from 55° F. to 180° F. in order to affect the cure, and then cooled by the addition of more water to 100° F. before being released to an acceptable disposal system.

This disadvantage may be overcome by using air in lieu of water to create the inverting force. Once the impregnated tube is fully inverted, it then can be cured with steam. Although water is necessary to produce steam, the quantity of water in the form of steam is only 5-10% of that required for water inversion, cure and cool down. This means that steam can be used even if water is not readily available on site. This drastic reduction in the quantity of water is the result of the higher energy available from one pound of water in the form of steam versus one pound of heated water.

One pound of steam condensing to one pound of water gives off approximately 1000 BTUs while one pound of water gives off only one BTU for each degree in temperature drop. This reduced water requirement plus virtual elimination of the heat up cycle greatly reduces cure cycle and installation time.

With this apparent advantage in using air inversion and steam cure why has the industry been slow to abandon water inversion and hot water cure?

When water is used to invert the resin-impregnated tube, the uninverted portion of the tube from the inverting nose to the inverting apparatus is buoyed up by a force equal to the quantity of water displaced by the tube. In the case of CIPP tubes, this mean the effective weight of the tube is substantially reduced, as is the force necessary to pull the uninverted tube forward to the inverting nose. When air is used to create the inverting force, the uninverted tube lies on the bottom of the pipe and the air pressure acting on the inverting nose of the tube must pull the full weight of the tube forward.

Three forces must be overcome to invert a CIPP tube no matter what is used to create the inverting energy. These forces are:

1. Force required to invert the tube (turn tube inside out). This force varies by tube thickness, material type and relation of tube thickness to diameter.

2. The force necessary to pull the tube from the inverting apparatus to the inversion nose.

3. The force necessary to pull the tube through the inverting apparatus.

Force number one (1) above is generally the same for both air and water inversions.

Force number two (2) varies greatly between air and water and can limit the length of air inversions. There is limit on how much pressure can be used to invert a tube without adversely affecting the quality of the installed CIPP tube and/or damaging to the existing conduit. Lubricant can be used for both water and air inversion to reduce the required pulling force.

Force number three {3} can vary based on the apparatus design. In most apparatus presently in use, the force required to pull the tube through the apparatus will increase when either or both forces one and two increase. This is caused by the fact that in order to increase available inversion energy, typical apparatus in use today restrict loss of pressurized fluid from the pressure chamber below the tube entry point into the apparatus and the cuff and banded end of the tube being inverted. This restriction is typically accomplished by increasing the air pressure in a pneumatic gland (i.e. Insituform's CHIP 10 Unit) or by using a gland that is energized by the inverting fluid (i.e. The Shooter cup seal). The movement inward in both cases is restricted by the gland material and compression of the inverting CIPP tube. This in turn causes an increase on the friction between the inverting CIPP tube and gland.

In view of these apparent benefits of steam cure compared to hot water cure, the use of steam has been proposed in view of the energy it carries. Air inversion of an inflation bladder and flow-through steam to cure has been disclosed in Insituform U.S. Pat. No. 6,708,728 and U.S. Pat. No. 6,679,293, the contents of which are incorporated herein by reference. The processes disclosed in these recently issued patents utilize pull in and inflate technology and are currently in use for small diameter liners. They provide advantages over water eversion for small diameters. Moreover, use of a puncturing canister disclosed in these patents is not suitable for medium and large diameter liners. Medium size liners are those between about 18 and 45 inches in diameter. Large diameters are those in excess of about 45 inches and larger in diameter.

Accordingly, it is desirable to provide an improved apparatus for an air inversion and porting assembly for flow through steam cure CIPP installation.

SUMMARY OF THE INVENTION

Generally speaking, in accordance with the invention, an apparatus for inverting a resin impregnated cured in place liner with air having a low friction seal between the moving CIPP liner and a stationary inverting gland is provided. Unlike other inverting apparatus in use today, this pre-shaped adjustable gland, once adjusted, does not increase friction on the tube when inverting fluid pressures are increased. A sample and porting pipe having an exhaust pipe with a porting gland receiving a porting tool is positioned in the distal access point. Once the inversion is completed, the porting tool is inserted into the inflated liner and an exhaust hose is connected.

The gland includes a slit with an adjustable gap in at least its thickness. The adjustment of the gap across the gland is made by moving rigid members substantially perpendicular to the liner passing through the gland. The gland may have one stationary side and one adjustable side. In this case, the stationary side has a steel backing plate with a temperature resistant—W' thick compressible layer of material, such as a resilient silicone rubber and a thin absorbent layer (⅛" or less) such as polyester felt facing the impermeable layer of the liner. This allows one to apply lubricant to the surface of the inverting CIPP liner. In this embodiment, the adjustable side of the gland has a substantially rigid one-inch thick shaped block of Nylon or the like, faced with a similar compressible and absorbent layer. The shaped block is sized and shaped specifically for the size and thickness of the CIPP tube to be inverted. The shaped block may be a one-piece member or be formed in sections, such as three or four depending on the lay flat size of the CIPP liner to be installed. A separate adjustment bolt is provided for each section of the block.

In another embodiment the gland is formed by a plurality of opposed fingers across the opening in the apparatus. Each finger is an air driven piston or rod sealed in a cylinder extending from a manifold positioned about the opening. The fingers may be positioned on one side facing a stationary opposed side or surround the liner on both flattened surfaces.

In a preferred embodiment the gland has one stationary side and one adjustable side. The stationary side has a steel backing plate faced with a temperature resistant—W' thick compressible layer of material such as silicone rubber and a thin absorbent layer (⅛" or less) such as polyester felt to apply lubricant to the surface of the CIPP tube. The adjustable side has a one-inch thick shaped Nylon blocks faced with a similar compressible and absorbent layer. The shaped block is sized and shaped specifically for the size and thickness of the CIPP tube to be inverted. Typically CIPP tubes intended for inversion are manufactured with the layers sized for final position. This means that prior to inversion the biggest circumference layer is on the inside and the smallest circumference coated layer is on the outside. This results in the inner layer having a folded area or thick spot in the tube cross-section. The compressible layers on each side of the gland accommodate this and any other tube cross-section irregularities. The folded area may move back and forth across the surface of the CIPP tube therefore a fixed accommodation for this change in tube spot thickness would be ineffective. The compressible layer, which surrounds the CIPP tube, is well suited to accommodate any tube spot thickness regardless of location. The limited area of increased friction caused by these thick spots helps to assure the low friction performance of this gland design.

Accordingly it is an object of the invention to provide an improved apparatus and method for inverting a CIPP liner with air.

It is another object of the invention to provide an apparatus for air inversion of a CIPP liner with an adjustable gland that does not increase the friction on the liner when the everting fluid pressure increases.

It is a further object of the invention to provide an apparatus for air inversion of CIPP liner and steam cure.

It is yet another object of the invention to provide a method for air inverting a CIPP liner and porting the downstream end of the inverted liner to allow flow-through of steam for curing the resin.

It is yet a further object of the invention to provide for air inversion and steam cure of a CIPP liner without allowing the inverted liner to collapse prior to steam cure.

Still other objects and advantages of the invention will in part be obvious and will in part be apparent from the specification.

The invention accordingly comprises the several steps and the relation of one or more of such steps with respect to the others, and the apparatuses possessing the features, properties and relation of elements which are exemplified in the detailed disclosure and the scope of the invention will be indicated in the claims.

BRIEF DESCRIPTION OF THE DRAWINGS

For a fuller understanding of the invention, references had to the following description taken in connection with the accompanying drawings in which:

FIG. 4 is an elevational view of an air inversion and steam cure apparatus with a CIPP liner ready for inversion constructed and arranged in accordance with the invention:

FIG. 6 is an elevational view in cross-section of the air inverter and steam cure apparatus of FIG. 4 in accordance with the invention.

DETAILED DESCRIPTION OF THE PREFERRED EMBODIMENTS

The following disclosure will describe an improved method and apparatus for air inverting and steam curing a CIPP tube in compliance with ASTM F1216 *Standard Practice for Rehabilitation of Existing Pipelines and Conduits by the Inversion and Curing of a Resin-Impregnated Tube*. The method and apparatus as described are well suited for working from the surface through structures, such as manholes to rehabilitate existing buried pipelines and conduits.

Figures 1A, 1B:
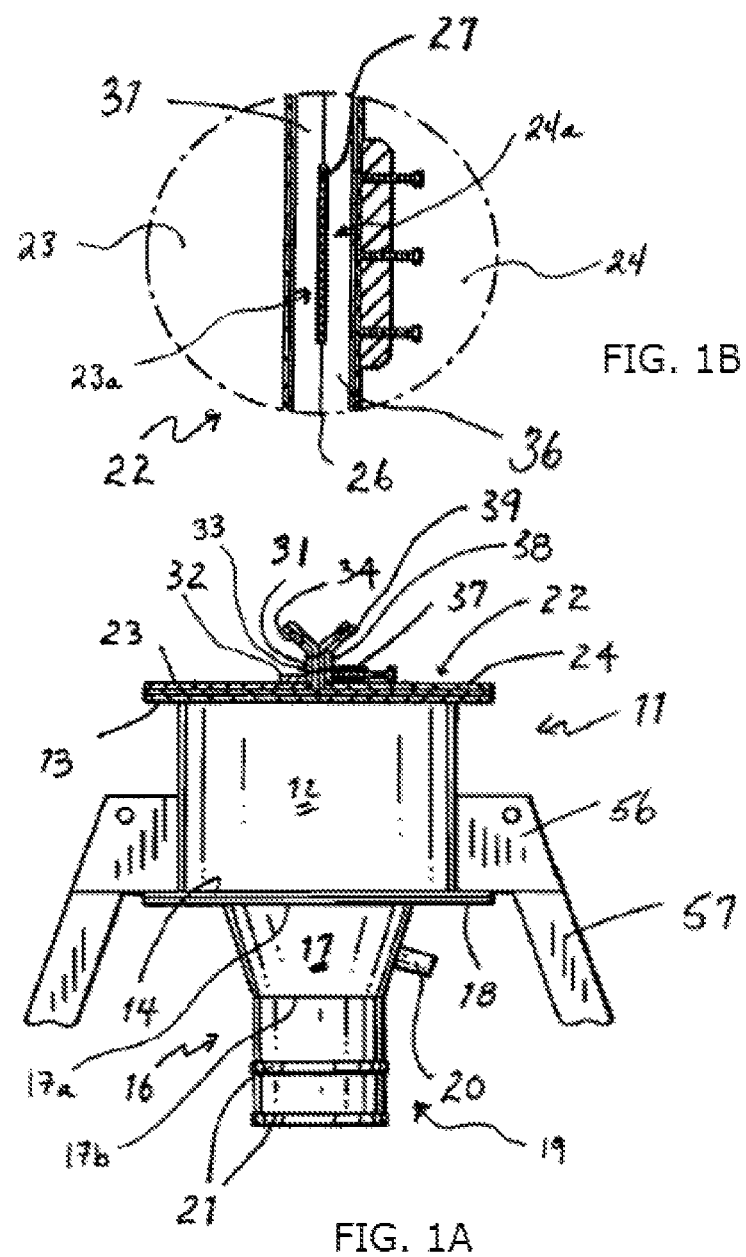
FIGS. 1A and 1B are an elevational view of an air inversion unit and a plan view of a gland to seal against a cured in place liner constructed and arranged in accordance with the invention.

Referring now to FIG. 1, an air inversion and steam cure unit II constructed and arranged in accordance with the invention is shown in elevation. Unit 11 is constructed of a rigid material, typically a metal such as a steel or aluminum, and the like. Composite materials or plastics are also suitable so long as they can withstand the internal pressures and temperatures to be generated during use.

Unit 11 includes a substantially cylindrical hollow pressure chamber 12 having an upper flange 13 and a bottom flange 14. A hollow inversion boot 16 is mounted to bottom flange 14. Inversion boot 16 includes an upper frusta-conical section 17 with a larger opening 17a and a smaller opening 17b and an annular flange 18 for securing boot 16 to bottom flange 14. This allows different diameter boots to be readily installed in unit 11. Smaller opening 17b of frusta-conical section 17 includes a substantially cylindrical banding boot 19 with external ribs 21 for securing a folded back portion of a cured in place liner 27 to be fed therethrough. Inversion boot 17 is also fitted with an air/steam inlet fitting 20.

The top of pressure chamber 12 is closed by a top cover 22 formed of a first semi-circular section 23 and a second semi-circular section 24. Both semi-circular top sections 23 and 24 are secured to upper flange 13 and facing cut-out regions 23a and 24a to form a gap 26 therebetween to allow passing liner 27 into unit II. The details of construction of gap 26 to form a gland 28 so that sufficient inversion pressure can be generated in pressure chamber 12 and inversion boot 16 will be described below.

Semi-circular portions 23 and 24 with cut-outs 23a and 24a are secured to upper flange 13 to form a gap 26 along the centerline between them. Semi-circular portion 23 includes a horizontal portion 37 of stationary gland bracket 31 with a horizontal mounting portion 32, a substantially vertical section 33 across the diameter of pressure chamber 12 and a flared section 34. Semi-circular section 23 includes cut-out 23 a region facing semi-circular portion 24.

Matching adjustable semi-circular portion 24 also includes an adjusting bracket 36 with a horizontal mounting section 37, a substantially vertical section 38 and a flared portion 39. Adjustment bracket 36 also presents cut-out region 24a to form the gap 26 with cut-out re g ion 23a. Here, moveable adjustment bracket 36 includes a cut-out or drawer region 41 for mounting at least one substantially rigid shaped block 42. Block 42 includes a tube inlet cut-out 43 facing the vertical section 33 of stationary bracket 31. Tube cut-out 43 is formed by an indentation in shaped block 42. Three gap adjustment screws 44 are mounted behind shaped block 42 for adjusting the position of block 42 to vary the size of gap 26 so as to engage liner 27 in use.

Two sheets of a compressible member 46 are positioned between both sections of top cover 22 and upper flange 13. Compressible material 46 is pulled up along the facing surfaces of gland brackets 31 and 36 and secured to bracket flared sections 34 and 39. This provides a smooth compressible and resilient path for liner 27 to be engaged in gland 28 as it passes through. In addition to compressible material 46, an absorbent layer 47 is positioned to the outside of compressible material 46 facing gland 28. This material may be an absorbent material such as a layer of felt 47 that can be oiled to provide lubricating for inverting liner 27. Alternatively, a layer of low friction material such as FEP, PFA or PTFE can be used to facilitate passage of liner 27 through gland 28. Use of compressible material 46 helps gland 28 conform to the cross-section and profile of liner 27. Gap adjustment screws 44 are mounted on adjustable bracket 36 to displace shaped block 42 towards opposed vertical section 33 to adjust the opening of gland 28.

Figure 3:
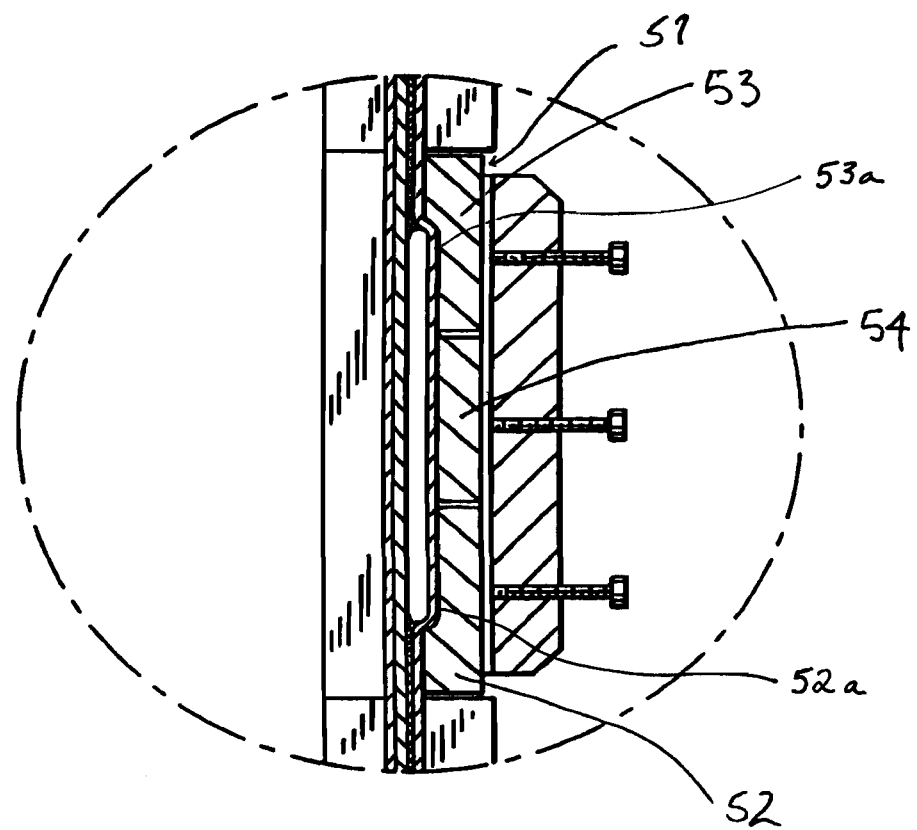
FIG. 3 is an enlarged top plan view of a gland having a segmented shaped block in accordance with a preferred embodiment of the invention.

In the embodiment illustrated in FIG. 3, shaped block 51 is formed in three individual segments, including two outer sections 52 and 53 with curved cut outs 52a and 53a and a straight mid-section 54. Here, bracket 36 includes individual pockets to hold blocks 52, 53 and 54 with opening in bracket vertical section 38 to allow movement towards stationary bracket 31 in response to tightening adjustment gap screws 44. Block mid-section 54 presents a straight edge, whereas outer sections, 52 and 53 form curved openings to conform to the lay flat shape of liner 27.

Unit 11 includes three leg mounting brackets 56 welded to the sidewall of pressure chamber 12 for fixing legs 57 for supporting unit 11 over an installation access opening Unit 11 is constructed of a rigid metallic material, such as steel or aluminum. Once assembled, semi-circular sections 23 and 24 with shaped block 42 and compressible material 46 form adjustable gland 28 for allowing liner 27 to pass therethrough when air pressure is introduced into air steam inlet 20.

Figure 2:
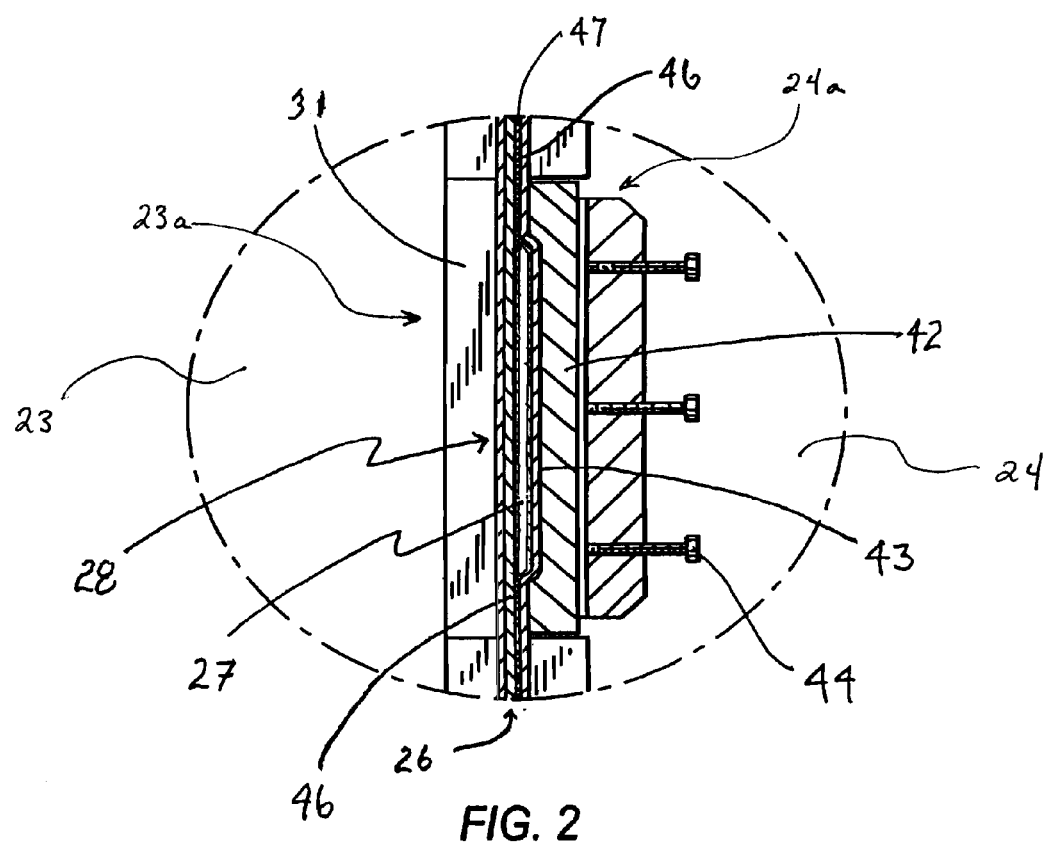
FIG. 2 is an enlarged top plan view of the gland of the air inversion unit of FIG. 1.

Shaped block 42 may be a single member as shown in the embodiment of FIG. 2 or included three sections, 52, 53 and 54 as shown in the embodiment in FIG. 3. Additional sections can also be formed which provide greater flexibility in adjusting gap for dealing with location of folds and variations in cross-sectional dimensions of liner 27 as it passes therethrough.

Compressible material 46 is a temperature resistant −3 to 20 mm, resilient layer of material, such as silicone rubber. A thin absorbent layer (2 to 8 mm) polyester felt to apply lubricant to the surface of CIPP liner 27 is placed on the outer surface of compressible layer 46. As noted above, a low friction material such as a PTFE scrim can be use in place of oiled felt. Gland 28 formed by gap 26 in top sections 23 and 24 may be infinitely variable by utilizing an embodiment having a plurality of hydraulic fingers such as shown in FIGS. 4 and 5.

Unit 11 is particularly well suited to install a small diameter CIPP liner in an existing conduit utilizing air to invert the liner and steam to cure. Small diameter liners are those having a diameter between about 6 and 12 inches (15 to 30 mm).

The following procedures are followed to install a cured in place liner by air inversion and steam cure using unit 11.

1. Adjustment screws 44 on adjustable bracket 36 of gland 28 are opened and a wet out CIPP liner 27 is threaded through gland 28 into pressure chamber 12 and banding boot 19. Liner 27 is cuffed back over the end of banding boot 19 and secured with two stainless steel bands. An air/steam hose is attached to steam air inlet 20 on inversion boot 16.

A hold back rope or cable is attached to the other end of CIPP liner 27. A suitable lubricant is placed on absorbent felt layers 47 at the inlet to air inverter unit 11. Gland 28 is adjusted with adjustment screws 44 to uniformly close gland 28 about CIPP liner 27.

2. The other end of the air steam line is connected to the air steam manifold. A steam supply line and air supply line are connected to the air steam manifold. All air and steam connections are checked for safety pins or whip checks installed. Once the air valve on the manifold is closed and the air regulator has been backed off to prevent air flow through it, the air supply line is connected to an air compressor. The air discharge line at the compressor is closed and the air compressor is then started.

3. When the air/steam operator has been checked to make sure that everything is safe and ready to proceed to send air to the air/steam manifold. The air/steam manifold operator then opens the air/steam supply line to the air inverter and slowly screws down the adjustment screw on the air regulator to increase the air supply to the desired air inversion pressure. The air inverter operator will simultaneously pull CIPP liner from the refrigerated storage truck or bin to feed into air inverter 11.

The inversion is continued until the trailing end of the liner is near air inverter unit 11. At this time the hold back rope up is threaded over rollers above the air inverter. Just prior to the end of the liner going into the air inverter, the hold back rope is wound around a capstan so that there is tension on the rope leading into air inverter 11.

Once the end of the liner goes through the gland in the top of the air inverter, the gland is adjusted to reduce air leakage. The hold back rope and inversion air pressure are controlled to maintain the same inversion speed and pressure used on the first half of the inversion.

Figures 7A, 7B:
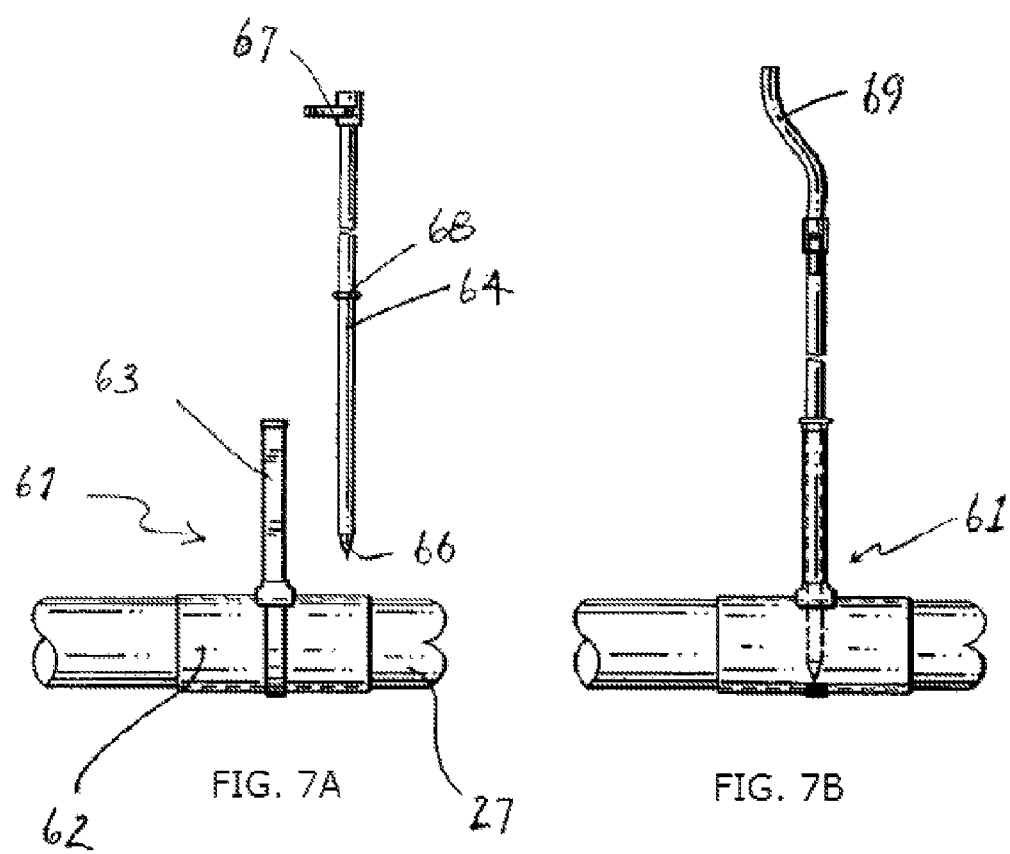
FIGS. 7A and 7B are schematic views of an inverting cured in place liner entering a sample and porting pipe, before and after porting with a porting tool.

As shown in FIGS. 7A and 7B a PVC or rigid pipe sample mold of metal with an exhaust pipe assembly 61 with a mold 62 and steel pipe 63 in the far manhole and align it to receive an inverting tube. As the inverting nose nears the far manhole, the inversion is slowed to allow the liner to enter sample mold 62 and steel pipe 63. The inversion is stopped when the nose of the inverting liner is about one diameter past the end of sample mold 62.

The hold back rope is tied off and the inverted liner is ported by inserting a steel-porting pipe 64 with a piercing point 66 at the lower end and a valve 67 at upper end. A flange or o-ring 68 is provided a point on porting pipe 64 to prevent pipe 64 from piercing the opposite side of the liner.

A crewmember who is responsible for porting notifies the inverting end that he is preparing to port the inverted liner so that they will be prepared to adjust the supply air to maintain pressure on the inverted liner once it has been ported.

Once the liner has been successfully ported, porting pipe valve 67 is closed and an exhaust hose with a valve at the far end is attached to porting pipe valve 67. Control of the exhaust is now at the far end of the exhaust hose.

5. The exhaust valve and air inlet regulator is adjusted to maintain good flow and recommended heat up and cure pressure. The boiler is blown down and the steam supply hose is attached to the air steam manifold. The manifold operator is notified that steam is being sent to the air steam manifold.

The air steam manifold operator notifies the far end that warm-up is starting. The interface temperature at the 6 O'clock position in the far manhole is recorded. The warm-up steam air mixture should be about 180° F. The warm-up is continued until there is a 3° F. increase at the inner-face in the far manhole.

6. Once warm-up is completed, air flow is slowly reduced and full steam is used to maintain the recommended cure pressure. Full steam cure is continued for about 1 hour recording inner-face temperatures at 15 minute intervals. And there is an inner-face temperature of 130° F. for at least 30 minutes of the 1 hour cure, cure is complete. If not, cure is extended until there is 130° F. for at least 30 minutes.

7. Once the cure cycle is completed, steam is slowly shut off while simultaneously adding air. Cure pressure should not be exceeded during cool down. The liner is cooled down for a minimum of 15 minutes or until interface is 130° F. at the far end, whichever is longer. Steam supply at boiler is then shut off. When the boiler supply hose pressure reaches zero, the steam supply hose is disconnected at the manifold. When cool down is complete, the air compressor is shut off and pressure in air hose is released prior to disconnecting air supply hose from manifold.

Depending upon the particular resin and tube thickness, once the cure is complete, steam flow is turned off while simultaneously adjusting the air flow to maintain cure pressured. The exhaust valve is adjusted while cooling to about 130° F. at the six o'clock position for at least one hour.

Once the temperature has cooled to the desired level, air flow pressure is reduced to zero, the exhaust valve is fully opened. Any condensate that may have accumulated in the bladder is removed by condensate drain on the exhaust assembly.

At this time, the confined space entry procedures are followed to remove ends from the lined pipe and reinstate services using standard procedures.

The flexible cured in place liner is of the type generally well known in the art. It is formed from at least one layer of a flexible resin impregnable material, such as a felt layer having an outer impermeable polymer film layer. The felt layer and film layer are stitched along a seam line to form a tubular liner. A compatible thermoplastic film in a form of a tape or extruded material is placed on or extruded over seam line in order to ensure the impermeability of the liner.

For larger liner diameters, several layers of felt material may be used. The felt layers may be natural or synthetic flexible resin absorbable materials, such as polyester or acrylic fibers. The impermeable film in the outer layer may be a polyolefin, such as polyethylene or polypropylene, a vinyl polymer, such as polyvinyl chloride, or a polyurethane as is well known in the art. In the initial step in all trenchless rehabilitation installations, the existing pipeline is prepared by cleaning and videotaping.

Prior to commencing installation pursuant to the method in accordance with the invention, a curable thermosetting resin is impregnated into the felt of a liner by a process referred to as "wet-out." The wet-out process generally involves injecting resin into the felt layer through the end or an opening formed in the impermeable film layer, drawing a vacuum and passing the impregnated liner through nip rollers as is well known in the lining art. One such procedure of this vacuum impregnation is described in Insituform U.S. Pat. No. 4,366,012, the contents of which are incorporated herein by reference. A wide variety of resins may be used, such as polyester, vinyl esters, epoxy resins and the like, which may be modified as desired. It is preferable to utilize a resin that is relatively stable at room temperature, but which cures readily when heated.

It can readily be seen that the process in accordance with the invention readily allows one to attain the advantage of curing a resin liner with flow through steam. By practicing the process, a tubular member can be easily everted through an existing pipeline. By providing a low friction gland on an eversion chamber, eversion pressure can be increased without increasing the friction on the moving liner. Steam is then passed through the curing liner to utilize the higher energy available in the steam to cure the resin significantly more efficiently than one can cure utilizing circulating hot water.

An air inverting unit 110 constructed and arranged in accordance with another embodiment of the invention is shown in FIG. 4. Unit 110 includes a rectangular trough or box 111 mounted on a frame 112 to be positioned over the inverting access to the conduit to be lined. A roller 113 is positioned at the top of frame 112 over box 111 to facilitate feeding resin impregnated liner 116 into box 111. The top of box 111 is partially closed by a pair of opposed plates 121 and 122 forming an opening 123 between sidewalls of box 111a and 111b of box 111. The bottom of box 111 is sealed and has an inversion nipple or boot 131 for securing inverted liner 116 thereabout. An air and steam inlet 132 is provided on a sidewall of box 111 to inject air/steam from an air supply line and a steam line.

The size of box 111 is selected so that flattened liner 116 does not occupy the full width of opening 123. This insures that air and steam can flow freely about the full perimeter of the liner to force the liner through inversion boot 131.

Figure 5A:
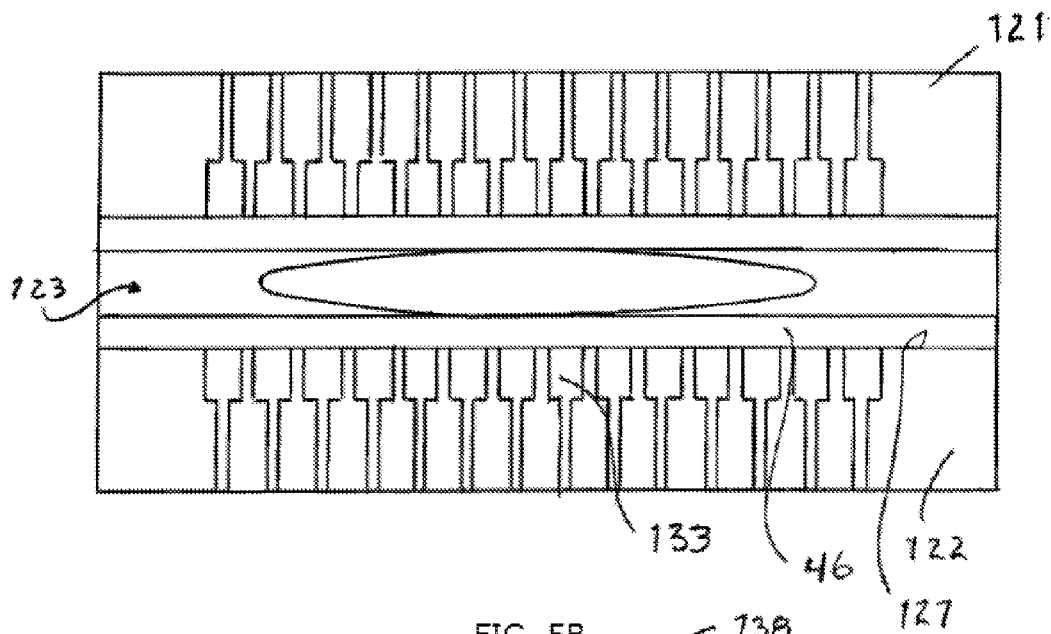
FIGS. 5A and 5B are plan views in schematic showing a plurality of fingers of the gland of the apparatus of FIG. 1 in an open and an operating position, respectively.
Figure 5B:
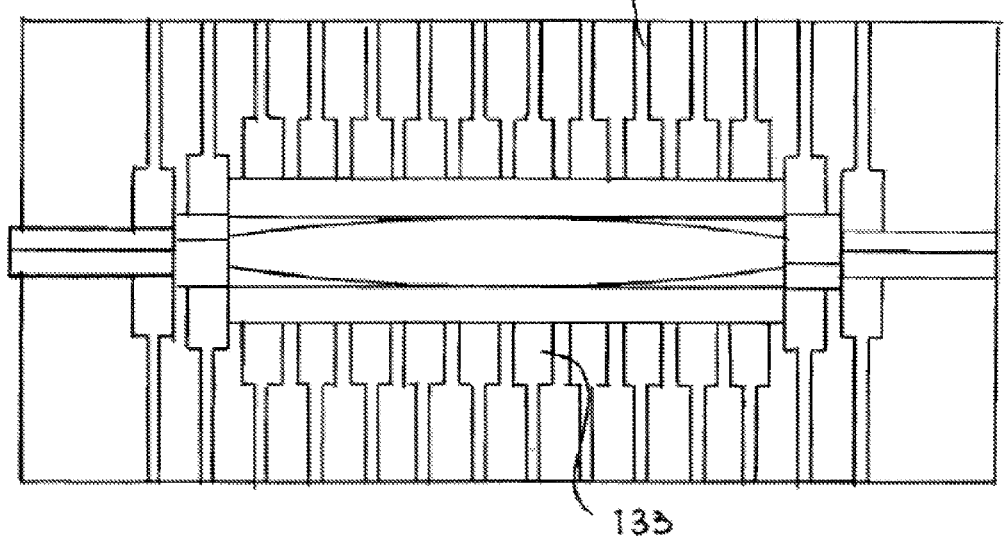

An elastomeric sheet 46 is folded across the top opening and a plurality of fingers 137 are positioned behind and in the fold of elastomeric sheet 46 to close opening 123 partially as shown in schematic in FIGS. 5A and 5B. This allows flattened liner 116 to pass through opening 123 and for fingers 137 to close opening 123 at the edges of liner as shown in schematic in FIG. 5B.

Fingers 137 are rigid rods 133 seated in individual cylinders 138 connected to an air manifold 139 as shown in the cross-section in FIG. 6. Manifold 139 has an air bleeder valve and gauge 141 and pressure relief valve 142. A rigid donut 146 about 1 to 3 cm. in diameter is mounted at the end of each rod 133 and contacts the back surface of 127 of folded elastomeric sheet 46. Each finger 137 is positioned so that the ends of donuts 146 form a continuously variable profile about liner 116 and close the unoccupied portion of opening 123 in box 111.

Elastomeric sheet 46 is a temperature resistant −3 to 20 mm. thick compressible layer of material such as silicone rubber with a thin absorbent layer 47 (2 to 8 mm.) such as polyester felt to apply lubricant to the surface of CIPP liner 116. Extending fingers 137 are positioned behind both sides of elastomeric sheet 46 to urge elastomeric sheet 46 and felt 47 into the opposite sides of CIPP liner 116. Typically, CIPP liners intended for inversion are manufactured with the layers sized for final position. This means that prior to inversion the biggest circumference layer is on the inside and the smallest circumference coated layer is on the outside. This results in the inner layer having a folded area or thick spot in the tube cross-section. Variable fingers 137 on each side of gland opening 123 accommodate for this and any other cross-section irregularities of liner 116. The folded area may also move back and forth across the surface of CIPP liner 116 and variably extending fingers 137 accommodate for this change in spot thickness.

In the illustrated embodiment, apparatus 110 includes 64 fingers 137, with 32 on each side of gland opening 123. It is contemplated that any number of fingers, such as from 32 to 128 can be used with donuts that are anywhere from 1 to 5 cm. in diameter. Obviously, the smaller the size of the donut the more fingers that can be included and the finer the variations in the shape or profile of the opening are possible. However, one must be careful that the donuts do not pierce the impermeable coating of the liner. The donuts should not be too large so as to form gaps at the edges of the flattened liner or at regions of changes in thickness.

Inversion boot 131 or nipple is elongated to accommodate flattened liner 116 passing through box 111 and has ribs or ridges to receive steel bands to secure liner 116. Clamping plates are provided to secure liner 116 against the elongated sides of the inversion boot 131.

The installation procedure utilizing inverter unit 110 is identical to that described for the earlier described embodiment using air inverter unit 11.

It will thus be seen that the objects set forth above, among those made apparent from the preceding description, are efficiently attained and, since certain changes may be made and carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

The invention claimed is:

1. An air inversion apparatus for use in installing a resin impregnated cured in placed pipe liner, the apparatus comprising:
    a substantially rigid pressure chamber having an interior space and including a cover having an opening therein providing access from outside the pressure chamber into the pressure chamber;
    a gland on the top cover arranged to block access to the top cover opening except through the gland, the gland comprising opposed gland members arranged generally on opposite sides of the top cover opening, each gland member extending away from the interior space of the pressure chamber, the gland members each being adapted for sliding sealing engagement with the liner outside the pressure chamber to permit passage of the liner into the pressure chamber for inversion of the liner by way of increased air pressure in the pressure chamber interior space, each gland member being operatively connected to an adjustment mechanism comprising a plurality of displaceable fingers positioned at different locations outside the container along the top cover and in generally side-by-side relation to one another on one side of the opening, the adjustment mechanisms being oriented in opposing relationship such that each adjustment mechanism is configured to individually drive the respective fingers to urge the respective gland member into sliding sealing engagement with the liner.

2. The apparatus of claim 1, wherein the fingers are selectively adjustable toward and away from the opening to adjust a sealing force applied to the liner by the gland members independently of a pressure inside the pressure chamber.

3. The apparatus of claim 1, wherein the fingers are selectively adjustable toward and away from the opening independently of a size of the liner.

4. An air inversion apparatus for installing a resin impregnated cured in place pipe liner, comprising:
    a substantially rigid container dimensioned to allow an impregnated cured in place liner to pass therethrough, the container having an elongate slot opening on a planar surface, such that the elongate slot opening defines an aperture within the one planar surface; and
    an adjustment mechanism comprising a plurality of displaceable fingers positioned for forming a seal against a liner passing through the slot opening, the fingers being positioned at different locations along the length of the elongate slot opening, outside the container, and in generally side-by-side relation to one another on one side of the elongate slot opening,
    wherein said seal is configured to seal the elongate slot opening against inversion pressure in the rigid container that inverts the liner and thereby drives the liner through the inversion apparatus without any other driving mechanism.

5. An air inversion apparatus for installing a resin impregnated cured in place pipe liner, comprising:
    a substantially rigid container dimensioned to allow an impregnated cured in place liner to pass therethrough;
    an impregnated cured in place liner passing through the rigid container;
    the container having an inlet surface, an outlet surface, an elongate slot opening on an inlet surface, an inversion chamber, and an outlet on the outlet surface;
    an air inlet on the inversion chamber for pressurizing the container;
    compressible material portions disposed on opposite sides of the elongate slot opening in generally opposing relationship with each other, the compressible material portions each extending from said inlet surface of the container away from and outside of the container for forming a seal with the liner at a location outside the container, the compressible material portions defining a gap across the elongate slot opening; and
    an adjustment mechanism, the compressible material portions being selectively adjustable by the adjustment mechanism from outside the gap toward and away from each other at a location outside the container;
    the adjustment mechanism comprising a plurality of rods positioned at different locations along the length of the elongate slot opening, outside the container, and in generally side-by-side relation to one another on one side of the elongate slot opening;
    the adjustment mechanism further comprising a plurality of air cylinders, each air cylinder being operatively connected to a respective one of the rods to drive the respective one of the rods toward the liner and thereby urge the compressible material portions against the liner passing through the elongate slot.

6. An air inversion apparatus for installing a resin impregnated cured in place pipe liner, comprising:
    a substantially rigid container having an inlet surface and an outlet surface, the container being dimensioned to allow an impregnated cured in place liner to pass therethrough;
    the container having an elongate inlet slot opening on the inlet surface and an inversion chamber and outlet on the outlet surface;
    an air inlet on the inversion chamber for pressurizing the container;
    compressible material portions disposed on opposite sides of the inlet slot opening in generally opposing relationship with each other, the compressible material portions each extending from said inlet surface of the container away from and outside of the container for forming a seal with the liner at a location outside the container, the compressible material portions defining a gap across the inlet slot opening; and
    an adjustment mechanism, the compressible material portions being selectively adjustable by the adjustment mechanism from outside the gap toward and away from each other at a location outside the container to more than two positions for changing a size of the gap therebetween independently of a size and a shape of the liner;
    the adjustment mechanism comprising a plurality of displaceable fingers positioned to urge the compressible material portions against a liner passing through the inlet slot opening, the fingers being positioned at different locations along the length of the inlet slot opening, outside the container, and in generally side-by-side relation to one another on one side of the inlet slot opening.

7. The apparatus of claim 6, wherein the plurality of displaceable fingers each include an air cylinder and a rod at least partially received in the cylinder, the rod being movable with respect to the cylinder in response to gas pressure within the cylinder.

8. The apparatus of claim 6, wherein the container is formed with a top having the inlet slot opening formed by at least two substantially rigid members supporting the compressible material portions on opposite sides of the gap and at least one of the rigid members is selectively moveable toward the other to adjust the size of the gap.

9. The apparatus of claim 6, further comprising an inversion boot located at the outlet of the container, and wherein the inversion boot is frusto-conical.

10. The apparatus of claim 6, wherein the container is formed of a metallic material.

11. The apparatus of claim 6, wherein the compressible material portions comprise an elastomeric material.

12. The apparatus of claim 11, wherein the elastomeric material is silicone rubber.

13. The apparatus of claim 6, wherein the adjustment mechanism further comprises a second plurality of displaceable fingers positioned to urge the compressible material portions against a liner passing through the inlet slot opening, the fingers of said second plurality being positioned at different locations along the length of the inlet slot opening, outside the container, and in generally side-by-side relation to one another on a side of the inlet slot opening opposite said one side.

14. The apparatus of claim 13, wherein each side of the inlet slot opening has between 16 and 64 fingers thereon.

15. The apparatus of claim 14, further comprising an inversion boot at the outlet of the container, and wherein the inversion boot is tapered to allow the liner to be turned back over the opening and secured thereto.

16. The apparatus of claim 6, wherein said plurality of fingers comprises at least 3 fingers.

17. The apparatus of claim 16, wherein each finger comprises an air driven rod.

18. The apparatus of claim 6, further including a low friction material on the surface of the compressible material portions.

19. The apparatus of claim 18, wherein the compressible material portions comprise silicone rubber and the low friction material comprises felt impregnated with a lubricant.

20. The apparatus of claim 6, wherein each finger comprises a rod driven by an air cylinder.

21. The apparatus of claim 6, wherein the compressible material portions are selectively adjustable toward and away from each other along a continuum over a range.

22. The apparatus of claim 6, wherein the compressible material portions are each formed of the same material.

23. The apparatus of claim 6, wherein the compressible material portions each comprise a first segment positioned for pressing against the liner to form the seal with the liner and a second segment above the first segment positioned so that the second segment is out of contact with the liner when the liner passes through the seal.

24. The apparatus of claim 6, wherein the compressible material portions are selectively adjustable toward and away from each other to adjust a sealing force applied to the liner by the compressible material portions independently of a pressure inside the container.

25. The apparatus of claim 6, wherein the container is substantially cylindrical.

26. The apparatus of claim 6, wherein the container is substantially rectangular.

27. The apparatus of claim 6, wherein the fingers are arranged in a plane that is generally horizontal when said surface on which the elongate slot is provided is generally horizontal.

28. The apparatus of claim 6, further comprising an air manifold, wherein the fingers comprise air driven rods connected to the air manifold.

29. The apparatus of claim 6, wherein the container is free of any driving mechanism for moving the liner through the container by means other than gas pressure.

30. The apparatus of claim 6, wherein the inlet slot opening is on a planar surface such that the inlet slot opening defines an aperture within the one planar surface.

31. The air inversion apparatus of claim 6, wherein the container includes a top comprising said inlet surface and the inlet slot opening, and the apparatus further comprises support structure adapted for supporting the container in a generally upright position for generally vertical feed of the liner into the inlet slot opening on the top of the container.

32. The air inversion apparatus of claim 6, wherein the container is free of any valve adapted for controlling fluid flow from the inlet surface to the outlet surface between the inlet surface and the outlet surface.

\* \* \* \* \*